United States Patent Office

3,788,885
Patented Jan. 29, 1974

3,788,885
FIBROUS MATERIALS
James Derek Birchall and John Edward Cassidy, Runcorn, England, assignors to Imperial Chemical Industries Limited, London, England
No Drawing. Continuation-in-part of abandoned application Ser. No. 42,499, June 1, 1970, and a continuation of application Ser. No. 274,964, July 25, 1972. This application Nov. 29, 1971, Ser. No. 203,084
Claims priority, application Great Britain, Dec. 11, 1970, 59,040/70
Int. Cl. B32b 17/00, 19/00; C07f 5/06
U.S. Cl. 117—126 AF  20 Claims

ABSTRACT OF THE DISCLOSURE

Inorganic fibrous materials are bound together in felted form by treatment with a solution of either (i) a complex phosphate of aluminum containing at least one chemically-bound molecule of a hydroxy compound, ROH, wherein R is an organic group or hydrogen and an anionic group of a strong inorganic acid, other than an oxyphosphorus acid, or of a carboxylic acid, or
(ii) an aluminum phosphate in which the ratio of the number of gram atoms of aluminum to the number of gram atoms of phosphorus is at least 1:1, and then heating an entangled mass of the fibres so as to deposit aluminum phosphate from the solution.

---

This is a continuation-in-part of copending application Ser. No. 42,499, filed on June 1, 1970, now abandoned, and now refiled as continuation application Ser. No. 274,964, filed July 25, 1972.

This invention relates to fibrous materials, and more particularly to felted inorganic fibrous materials and a method for making them.

Inorganic fibrous materials, for example glass fibre, are difficult to form into melted masses, i.e. masses in which the fibres are intermingled with each other and strongly held together at points where they make contact with each other. Organic resins can be used to achieve a felted effect, but such resins are not stable to high temperatures.

According to our invention we provide a process for binding inorganic fibrous materials in felted form, which comprises treating inorganic fibrous materials with a solution of either—

(i) a complex phosphate of aluminum containing at least one chemically-bound molecule of a hydroxy compound, ROH, wherein R is an organic group or hydrogen and an anionic group of a strong inorganic acid, other than an oxyphosphorus acid, or of a carboxylic acid, or
(ii) an aluminum phosphate in which the ratio of the number of gram atoms of aluminum to the number of gram atoms of phosphorus is at least 1:1, and then heating an entangled mass of the fibres so as to deposit aluminum phosphate from the solution.

The quantity of aluminum phosphate or complex phosphate in the solution may vary over a wide range and may be, for example, from 1% to 80%, preferably 20% to 75%, by weight of the solution.

The complex phosphates which are particularly preferred are those in which the anionic group is a halogen, and preferably chlorine although the complexes may contain other halogens, for example bromine or iodine. These halogen-containing complex phosphates are more fully described in copending U.S. application Ser. No. 42,499, now abandoned, now refiled as continuation application Ser. No. 274,964, filed July 25, 1972. Other suitable complex phosphates are those in which the anionic group is other than halogen. Of this latter type, those in which the R is an organic group are more fully described in copending U.S. application Ser. No. 296,983, filed Oct. 12, 1972, and those in which R is hydrogen are more fully described in copending application Ser. No. 296,985, filed Oct. 12, 1972. Examples of these other anionic groups include nitrate which is particularly preferred, sulphate, acetate, benzoate and perchlorate.

In the complex phosphates, where R is an organic group, it is preferred that it be an aliphatic hydrocarbon group or a substituted aliphatic hydrocarbon group, for example wherein the substituent is one or more of the following: amino, phenyl, hydroxyl, carbonyl or alkoxy. Unsubstituted aliphatic alcohols are especially preferred as the hydroxy compound since complex phosphates containing them are easily separated solids obtainable in high yield. We have found that aliphatic alcohols containing one to ten carbon atoms are especially suitable, and owing to their ready availability we prefer to use aliphatic alcohols containing from one to four carbon atoms, for example methanol, ethyl alcohol, n-propyl alcohol or isopropyl alcohol.

The ratio of the number of gram atoms of aluminum to the number of grams atoms of phosphorus in the complex phosphate may vary over a wide range, for example from 1:2 to 2:1, more especially 1:1 to 2:1, but is preferably substantially 1:1. The ratio of the number of gram atoms of aluminum to the number of gram atoms of halogen in the complex phosphates is preferably substantially 1:1.

The complex phosphates may be monomeric or polymeric. The monomeric forms, or the repeating units of the polymeric forms of the complex phosphates, may contain, for example, from one to five molecules of the hydroxy compound.

Most frequently the number of molecules of the hydroxy compound is four. In some cases the complex phosphates may contain molecules of different hydroxy compounds, for example they may contain both chemically-bound water and a chemically-bound organic hydroxy compound, the total number of such molecules being, for example, from two to five.

Examples of complex phosphates include:

(a) That containing chlorine and ethyl alcohol and having the empirical formula $AlPClH_{25}C_8O_8$. The infra-red and X-ray characteristics of the compound are described in Example 1 of the aforesaid application Ser. No. 42,499 now abandoned, now refiled as continuation application Ser. No. 274,964, filed July 25, 1972. It is designated aluminum chlorophosphate ethanolate, and for convenience is referred to herein as ACPE;

(b) That containing chemically-bound water and chlorine and having the empirical formula $AlPClH_{11}O_9$. The infra-red and X-ray characteristics of the compound are described in Example 6 of the aforesaid application Ser. No. 42,499 now abandoned, now refiled as continuation application Ser. No. 274,964, filed July 25, 1972. It is designated aluminum chlorophosphate hydrate, and for convenience is referred to as ACPH;

(c) That containing bromine and ethyl alcohol having an empirical formula $AlPBrH_{25}C_8O_8$. The infra-red and X-ray characteristics of the compound are described in Example 7 of the aforesaid application Ser. No. 42,499, now abandoned, now refiled as continuation application Ser. No. 274,964, filed July 25, 1972. It is designated aluminum bromophosphate ethanolate, and for convenience is referred to as ABPE.

It is to be understood, however, that these designations in no way imply any particular molecular structures for the compounds.

A particularly suitable halogen-containing complex phosphate containing chemically-bound water is that obtained by the process described in application Ser. No. 245,196, filed Apr. 18, 1972, in which aluminum orthophosphate hydrate is contacted with a reactant gas comprising halogen-acid gas and/or a gaseous halogen. When the gas is hydrogen chloride and the hydrate $$AlPO_4.3H_2O$$

a compound containing three molecules of water is obtained and having the empirical formula $AlPClH_7O_7$.

When using aluminum phosphate itself it is generally desirable to use aluminum orthophosphate ($AlPO_4$) or its hydrates. The aluminum phosphate may be added as such to the composition or it may be formed in situ, for example by dissolving or dispersing aluminum or a suitable compound in orthophosphoric acid. Suitable compounds include aluminum oxide or hydroxide or the aluminum salt of a volatile acid, e.g. aluminum nitrate, chloride, oxychloride or hydroxy chloride. Suitably, the orthophosphoric acid may be mixed with a volatile acid, particularly when using aluminum or a compound other than the salts of the volatile acid. When using phosphoric acid it is essential to avoid using an excess so that the Al:P ratio does not fall below 1:1.

Suitable solvents for the complex phosphates are disclosed in application Ser. No. 42,499, now abandoned, now refiled as continuation application Ser. No. 274,964, filed July 25, 1972, and are preferably polar solvents, e.g. methanol, ethanol, isopropanol, butanol, ethylene glycol monoethyl ether, water or a mixture of two or more such solvents. Mixtures of solvents may be used, for example a mixture of chloroform with methanol.

It is important that the solvent is not one which will change the Al:P ratio in the aluminum phosphate to less than 1:1. Thus, when using aluminum orthophosphate ($AlPO_4$) it is desirable to dissolve it in an aqueous acid, preferably one that will volatize without too much difficulty and preferably a mineral acid, e.g. hydrochloric, nitric, or sulphuric acid. Phosphoric acid is unsuitable since it would adversely affect the Al:P ratio. If desired, other solvents may be included, particularly organic solvents, e.g. alcohols of one to five carbon atoms.

If desired the solution of the complex phosphate or the aluminum phosphate may be used in admixture with one or more other binders. Examples of such binders include silicates, e.g. alkyl silicates, such as ethyl or isopropyl silicate, aminoalkyl silicates, monoethanolamine orthosilicate, alkali metal silicates such as sodium and/or potassium silicate; silica sols; metal oxychlorides such as aluminum oxychloride; gypsum/silica mixes and cements such as aluminous or portland cement. The solutions may also include other additives, for example surface-active agents in an amount of, for example, 0.1% to 2% by weight.

The solutions are heated to form aluminum orthophosphate ($AlPO_4$), for example by heating to temperatures of at least 50° C. and preferably 80° C. to 250° C. though higher temperatures (for example up to 800° C. or more) may be used if desired.

It is usually necessary to provide only sufficient solution to form a bond where the fibres overlap each other. The deposit need not be restricted to these points, however, and it is usually convenient to coat substantially all the surfaces of the fibres even though adhesion of the fibres to each other will only occur locally.

The inorganic fibrous materias which may be used for the purposes of the present invention include those derived from fusible or refractory inorganic materials, and examples include fibres derived from glass, asbestos, alumina, zirconia, and various metal silicates and aluminosilicates, for example calcium silicate and aluminum silicate. Particular forms which may be used are those sometimes termed glass wool, slag wood and mineral wool.

The methods which may be used for application of the binder to the fibrous material may be any of those known in the art; but it is usually most convenient to apply a solution of the aluminum phosphate or complex phosphate (for example by spraying or sprinkling) to a loose mat or layer of the fibrous material, then to pack the treated fibres into a mould or other enclosure which makes it take up the desired shape and packing density, and finally drying and heating. If desired the treated fibres may be dried and heated in a loose state, when some matting or felting of the fibres will occur; this gives a product which has been partly bound by the aluminum phosphate and may be adequate for some purposes, for example loose sheets or matting for lagging purposes.

The products produced according to the invention have the advantage that the binder is inorganic and is not destroyed or burnt away at high temperatures and also that the precursor is readily hardened at relatively low temperatures, thus leading to ease of fabrication of the felted compositions into shapes which are durable and portable without undue risk of deformation. Articles which may be made from the felted fibrous compositions include filters and various forms of lagging and other light-weight insulating bodies.

The invention is illustrated in the following examples in which parts and percentages are by weight. In the examples ACPH referse to the chlorine-containing complex aluminum phosphates mentioned previously and obtained by the procedure of Example 6 of application Ser. No. 42,499, now abandoned, now refiled as continuation application Ser. No. 274,964, filed July 25, 1972.

EXAMPLE 1

Solid ACPH was dissolved in water to give a 50% solution. A blanket of aluminum silicate fibre of density 128 kg. per cubic meter and 19 mm. in thickness was impregnated with the solution. The blanket was placed between steel platens faced with polytetrafluoroethylene which were then brought together so that the blanket was squeezed to half its thickness and excess solution squeezed out. The blanket was then cured for four hours at 200° C. A rigid refractory board was obtained.

EXAMPLE 2

Solid ACPH was dissolved in water to give a 50% viscous solution. A chopped glass strand mat, having a thickness of approximately 2 mm. and a density of 0.6 kg. per square meter, was wetted with this solution and excess liquid squeezed out. A second mat was laid on top and the wetting and squeezing were repeated. This procedure was repeated until six layers were built up. The composite was then placed between steel platens faced with polytetrafluoroethylene, spaced 6 mm. apart, and was cured for two days at 200° C. A rigid board was obtained in which nails and screws could be satisfactorily held.

EXAMPLE 3

Example 2 was repeated except that instead of the ACPH solution there was used a solution obtained by dissolving aluminum chloride in an equimolar quantity of 88% orthophosphoric acid. A similar rigid board was obtained.

We claim:

1. A process for binding inorganic fibrous materials in felted form which comprises applying to the fibrous material a solution of a complex phosphate of aluminum containing at least one molecule of a hydroxy compound ROH wherein R is selected from the group consisting of hydrogen and organic groups containing from 1 to 10 carbon atoms, and also containing an anionic group selected from the group consisting of halide, nitrate, sulphate, perchlorate and carboxylic acids, and heating the fibres to a temperature of at least 50° C. to deposit aluminum phosphate.

2. A process according to claim 1 in which the solution comprises the complex phosphate in an amount of 1% to 80% by weight of the solution.

3. A process according to claim 2 in which the solution comprises the complex phosphate in an amount of 20% to 75% by weight of the solution.

4. A process according to claim 1 in which the ratio of the number of gram atoms of aluminum to the number of gram atoms of phosphorus in the complex phosphate is at least 1:1.

5. A process according to claim 4 in which the ratio in the complex phosphate is substantially equal to 1:1.

6. A process according to claim 1 in which the hydroxy compound of the complex phosphate is an aliphatic alcohol containing one to four carbon atoms.

7. A process according to claim 6 in which the alcohol is ethyl alcohol.

8. A process according to claim 1 in which the anionic group is selected from the group consisting of a nitrate, sulphate, acetate, benzoate and perchlorate.

9. A process according to claim 1 in which the anionic group is a halide.

10. A process according to claim 9 in which the halide is chloride.

11. A process according to claim 10 in which the complex phosphate is selected from the group consisting of that containing four molecules of chemically-bound ethyl alcohol and having the empirical formula $AlPClH_{25}C_8O_8$, that containing five molecules of chemically-boupnd water and having the empirical formula $AlPClH_{11}O_9$ and that containing three molecules of water and having the empirical formula $AlPClH_7O_7$.

12. A process according to claim 1 in which the solvent for the solution is selected from the group consisting of methanol, ethanol, isopropanol, butanol, ethylene glycol monoethyl ether, water and a mixture of chloroform with methanol.

13. A process according to claim 1 in which the fibrous material is derived from the group consisting of glass, asbestos, alumina, zirconia, calcium silicate and aluminum silicate.

14. A process according to claim 1 in which the temperature is from 80° C. to 250° C.

15. A process for binding inorganic fibrous materials in felted form which comprises applying to the fibrous material a solution of an aluminum phosphate in which the ratio of the number of gram atoms of aluminum to the number of gram atoms of phosphorus is at least 1:1, wherein the said solvent is a mineral acid other than phosphoric acid, and heating the fibres to a temperature of at least 50° C. to deposit aluminum phosphate.

16. A process according to claim 15 in which the solution comprises the aluminum phosphate in an amount of 1% to 80% by weight of the solution.

17. A process according to claim 15 in which the solution comprises the aluminum phosphate in an amount of 20% to 75% by weight of the solution.

18. A process according to claim 15 in which the said ratio of Al:P is substantially equal to 1:1.

19. A process according to claim 15 in which the fibrous material is derived from the group consisting of glass, asbestos, alumina, zirconia, calcium silicate and aluminum silicate.

20. A process according to claim 15 in which the temperature is from 80° C. to 250° C.

References Cited

UNITED STATES PATENTS

| | | | |
|---|---|---|---|
| 2,610,957 | 9/1952 | Steinman, et al. | 117—126 GF |
| 2,702,068 | 2/1955 | Spooner | 117—126 AF |
| 2,444,347 | 6/1948 | Greger | 117—126 GF |
| 3,232,865 | 2/1966 | Quinn, et al. | 117—126 AF |
| 2,885,417 | 5/1959 | Heyden | 260—448 R |
| 2,901,379 | 8/1959 | Shannon, et al. | 117—124 |

FOREIGN PATENTS

| | | |
|---|---|---|
| 7,008,594 | 12/1970 | Netherlands. |
| 1,117,031 | 11/1961 | West Germany. |

WILLIAM D. MARTIN, Primary Examiner

W. H. SCHMIDT, Assistant Examiner

U.S. Cl. X.R.

117—126 GF, 140 R, 169 R; 260—448 R